Figure 4:
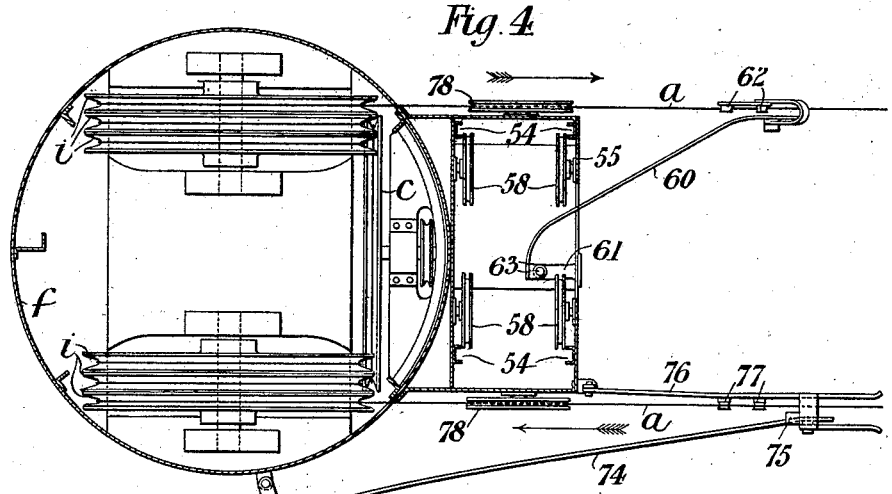

No. 676,143. Patented June 11, 1901.
G. C. MACKROW & H. G. CAMERON.
APPLIANCE FOR TRANSPORTATION OF COAL OR OTHER SUPPLIES, CHIEFLY DESIGNED FOR SHIPS AT SEA.
(Application filed Jan. 8, 1901.)
(No Model.) 6 Sheets—Sheet 1.
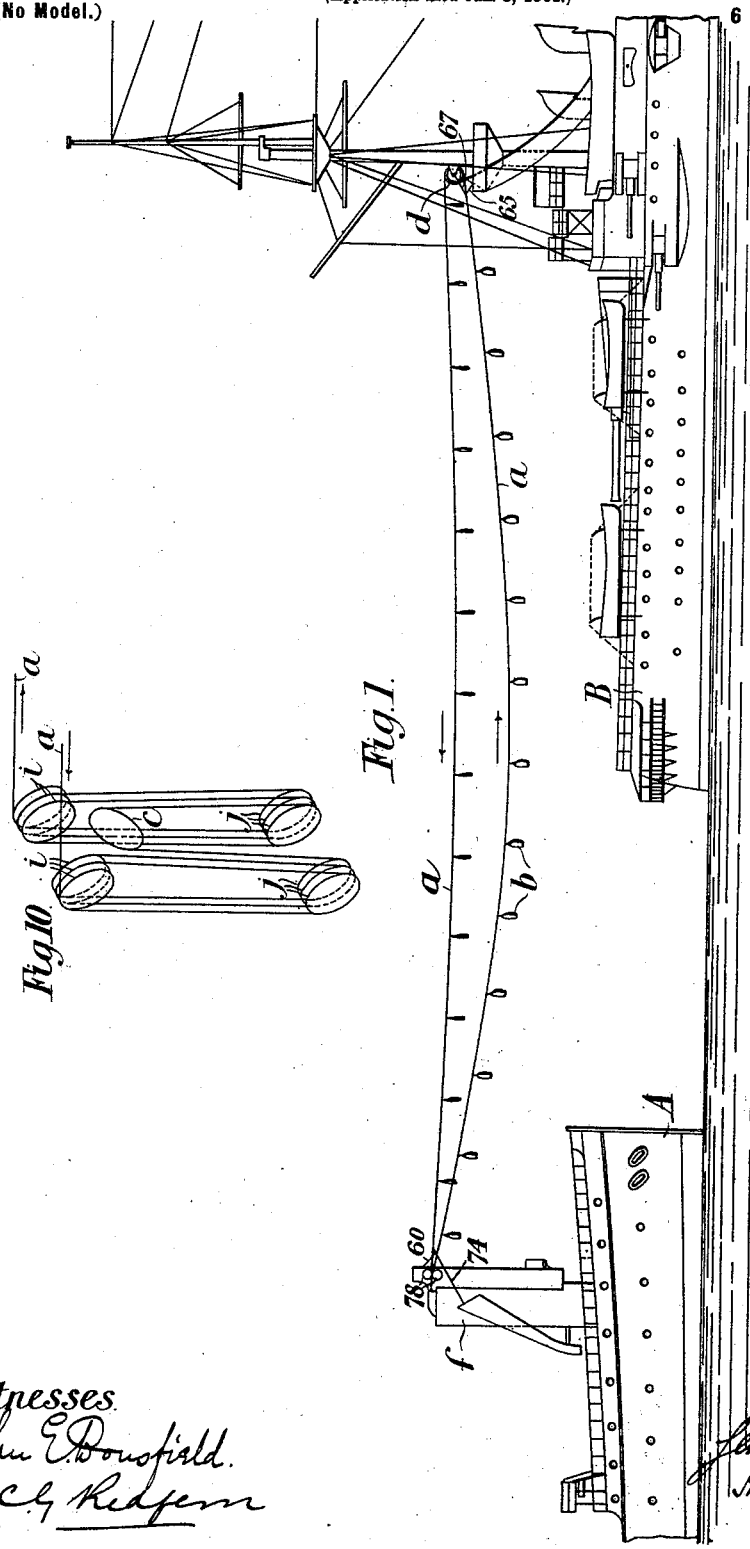
Witnesses.
Inventors.

No. 676,143. Patented June 11, 1901.
G. C. MACKROW & H. G. CAMERON.
APPLIANCE FOR TRANSPORTATION OF COAL OR OTHER SUPPLIES, CHIEFLY DESIGNED FOR SHIPS AT SEA.
(Application filed Jan. 8, 1901.)
(No Model.) 6 Sheets—Sheet 2.
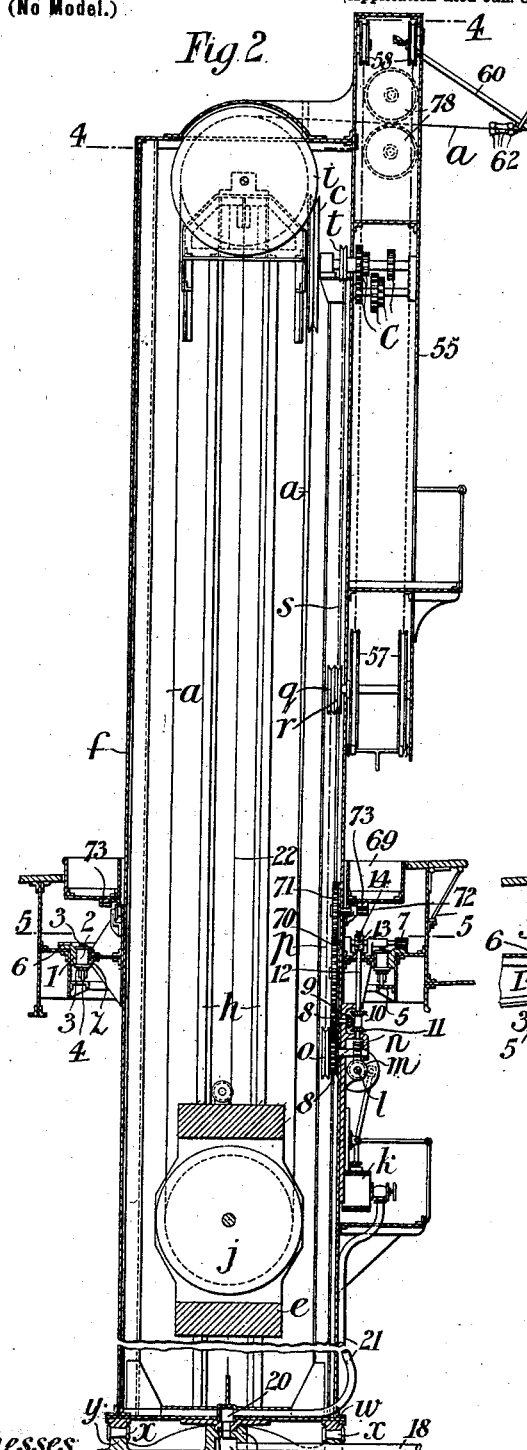
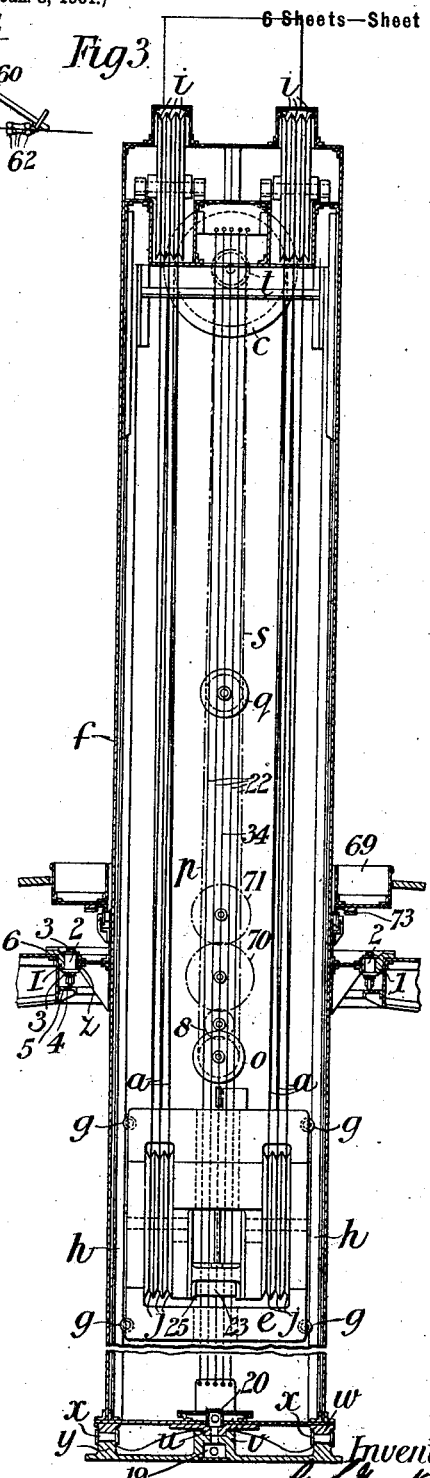
Witnesses: Inventors No. 676,143. Patented June 11, 1901.
G. C. MACKROW & H. G. CAMERON.
APPLIANCE FOR TRANSPORTATION OF COAL OR OTHER SUPPLIES, CHIEFLY DESIGNED FOR SHIPS AT SEA.
(Application filed Jan. 8, 1901.)

(No Model.) 6 Sheets—Sheet 3.

Witnesses
Inventors

No. 676,143. Patented June 11, 1901.
G. C. MACKROW & H. G. CAMERON.
APPLIANCE FOR TRANSPORTATION OF COAL OR OTHER SUPPLIES, CHIEFLY DESIGNED FOR SHIPS AT SEA.
(Application filed Jan. 8, 1901.)

(No Model.) 6 Sheets—Sheet 4.

Witnesses
Inventors.

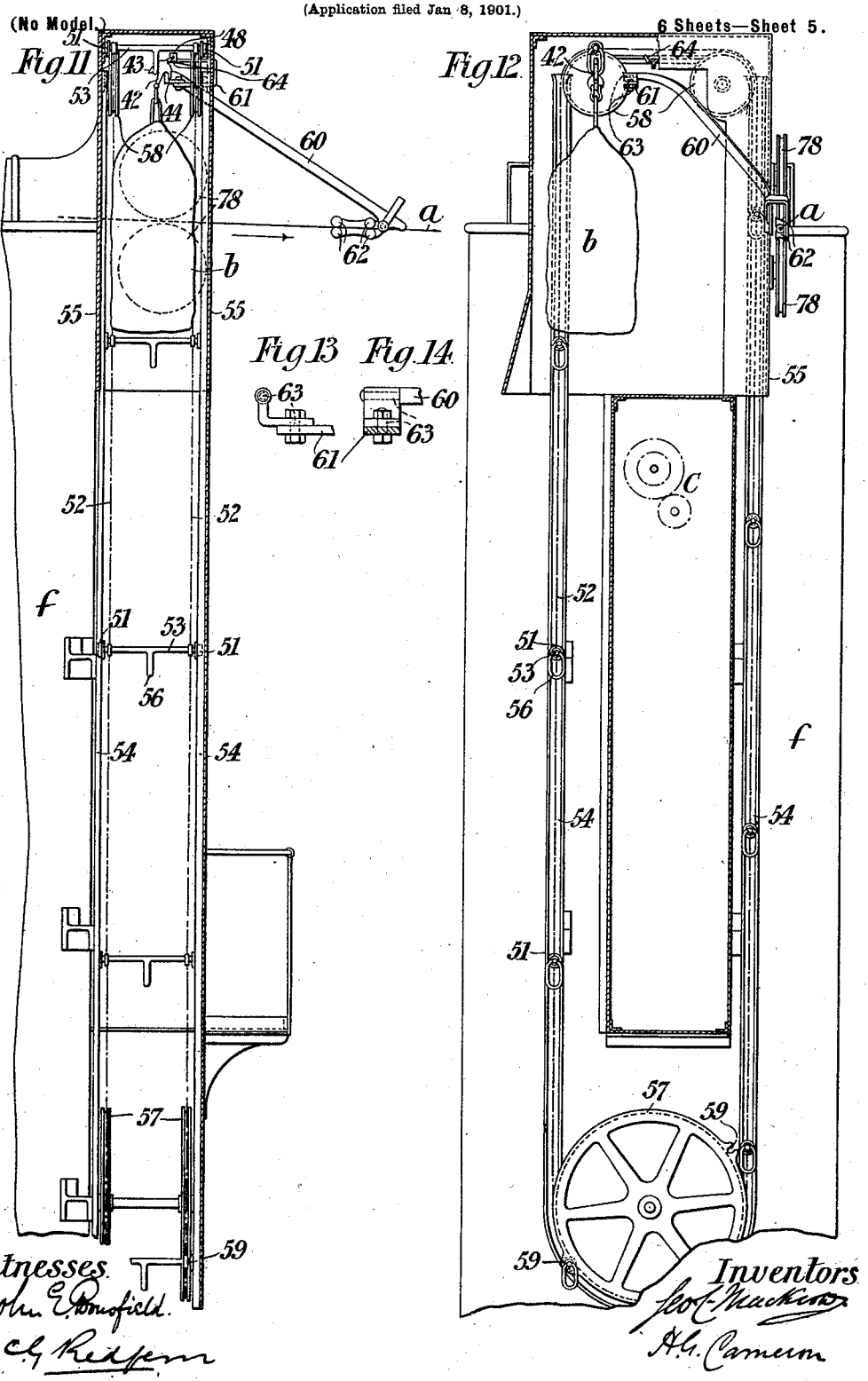

No. 676,143. Patented June 11, 1901.
G. C. MACKROW & H. G. CAMERON.
APPLIANCE FOR TRANSPORTATION OF COAL OR OTHER SUPPLIES, CHIEFLY DESIGNED FOR SHIPS AT SEA.
(Application filed Jan. 8, 1901.)
(No Model.) 6 Sheets—Sheet 6.
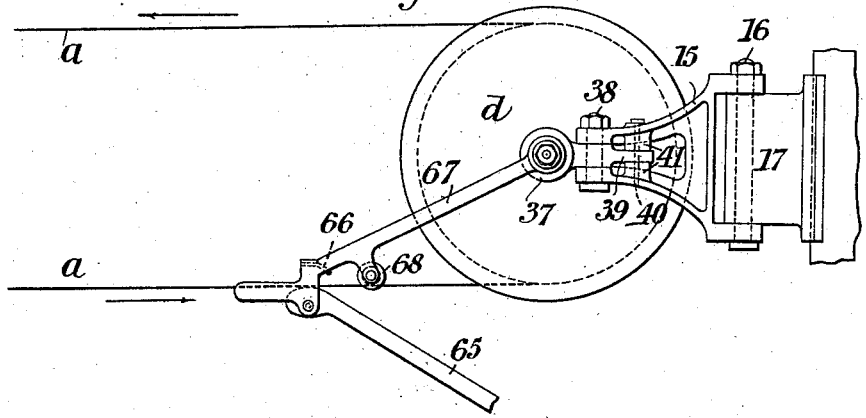
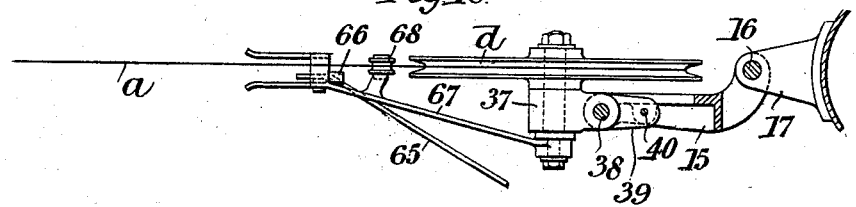
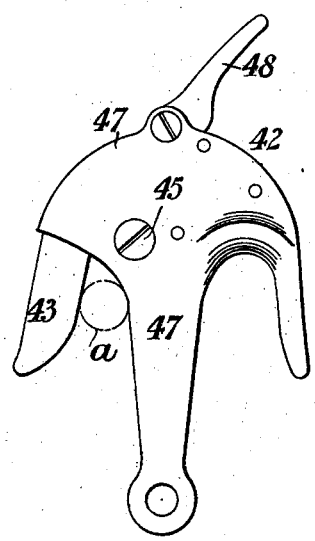 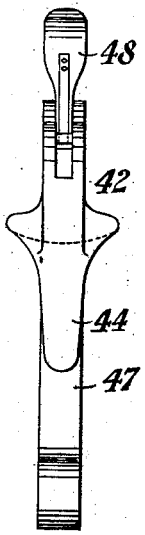 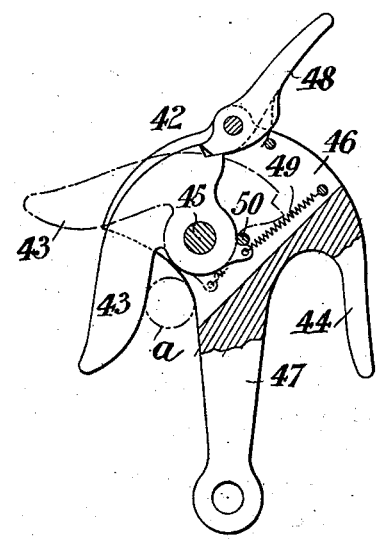
Witnesses. Inventors

UNITED STATES PATENT OFFICE.

GEORGE COLBY MACKROW AND HERBERT GEORGE CAMERON, OF LONDON, ENGLAND.

APPLIANCE FOR TRANSPORTATION OF COAL OR OTHER SUPPLIES, CHIEFLY DESIGNED FOR SHIPS AT SEA.

SPECIFICATION forming part of Letters Patent No. 676,143, dated June 11, 1901.

Application filed January 8, 1901. Serial No. 42,545. (No model.)

*To all whom it may concern:*

Be it known that we, GEORGE COLBY MACKROW and HERBERT GEORGE CAMERON, subjects of the Queen of Great Britain, residing at Orchard Yard, Blackwall, London, England, have invented new and useful Improvements in Transporting Apparatus, of which the following is a specification.

This invention has for its object to provide means for transporting coal or other supplies from one ship to another (or from a ship to the shore, or vice versa) when the distance over which the supplies are to be transported cannot be kept constant—as, for instance, when coaling a battle-ship from a collier or transport when both are under way.

According to our invention we employ an endless traveling rope for transporting the coal or the like in suitable receptacles, the said rope passing around sheaves or pulleys on each of the ships, and in order that a practically uniform tension of the said rope shall be maintained, notwithstanding the distance between the ships varying, we provide a weight supported by and on the said rope, the said weight rising when the ships recede from one another and falling when they approach, and in order that the varying movements of the weight shall be small relatively with the corresponding movements of the ships the rope is arranged to pass around a system of pulleys.

In carrying out our invention we provide a vertical trunk or jib, in which the weight is suspended on the traveling rope, a series of free sheaves or pulleys being fixed in the upper part of the trunk and on the weight around which sheaves the endless rope is passed in succession, and which may be termed "store-pulleys," as they carry so much of the rope as is not being utilized in so far as the actual distance between the two points is concerned. The weight may consist either of solid metal or of a tank containing water, built up of plates, if found desirable, and the endless rope may be driven from any convenient position along its length, but preferably by a sheave attached to the trunk or jib and operated by a motor. The trunk or jib is advantageously arranged so that it can be slued or turned on a vertical axis, so as to allow the ships to vary their relative positions without stopping the coaling operation, the sheave or pulley on the ship being supplied being also arranged to turn on an axis to correspond. To prevent the weight in the trunk or jib falling by reason of the traveling rope being suddenly cast off or breaking, a series of wire ropes is arranged in the trunk or jib and passing through the center of the weight, which ropes are designed to be seized by a grip on the said weights the instant the latter begins to descend at a greater speed than the normal working speed. To provide against accident to the trunk or jib should an exceptional strain come upon the traveling rope, we arrange the sheave on the ship being supplied to throw off the rope automatically.

For the transmission of the bags or packages of coal or other stores from the transport we make use of a series of double hooks, one member of each of which is a slip or disengaging tongue or hook normally locked by a spring-catch and the other a fixed hook, the former being designed for engagement with a suitable hoisting-gear and to engage the outgoing part of the traveling rope, while the latter is designed to slide upon an inclined bar or rail, which we term a "shunt-bar," and which serves for directing the hook onto the rope after being released from the hoist. The said hoisting-gear advantageously consists of a series of rollers or trolleys secured to two endless wire ropes passing around pulleys, the rollers or trolleys running in pairs in grooves fitted in a casing on the trunk or jib. On a small shaft carrying each pair of rollers a shackle is fitted, onto which the bags of coal or the like are hooked. The slip-hook when reaching the shunt-bar becomes disengaged from the hoisting-gear by its spring-catch coming into contact with a striking-plate, the other or fixed member of the double hook engaging the shunt-bar. The double hook then slides down the shunt-bar and engages the traveling rope by means of the slip-hook, the spring-catch of which, when the bag arrives at the ship to be supplied, again comes into contact with a striking-plate to again disengage the slip-hook from the rope, the fixed member of the hook then engaging another shunt-bar, down which it slides to any required position. The empty bags are returned in a similar manner on the returning part of the traveling rope. As the shunt-bar and the double hook for supporting the bags are applicable for use in conjunction with other systems of rope transport besides that herein described, we have embodied these features in an application filed of even date with this application and given Serial No. 42,546, so that no specific claim will be made to them herein, they being simply included in order to illustrate the complete working of our apparatus.

To enable our invention to be fully understood, we will describe it by reference to the accompanying drawings, in which—

Figure 5:
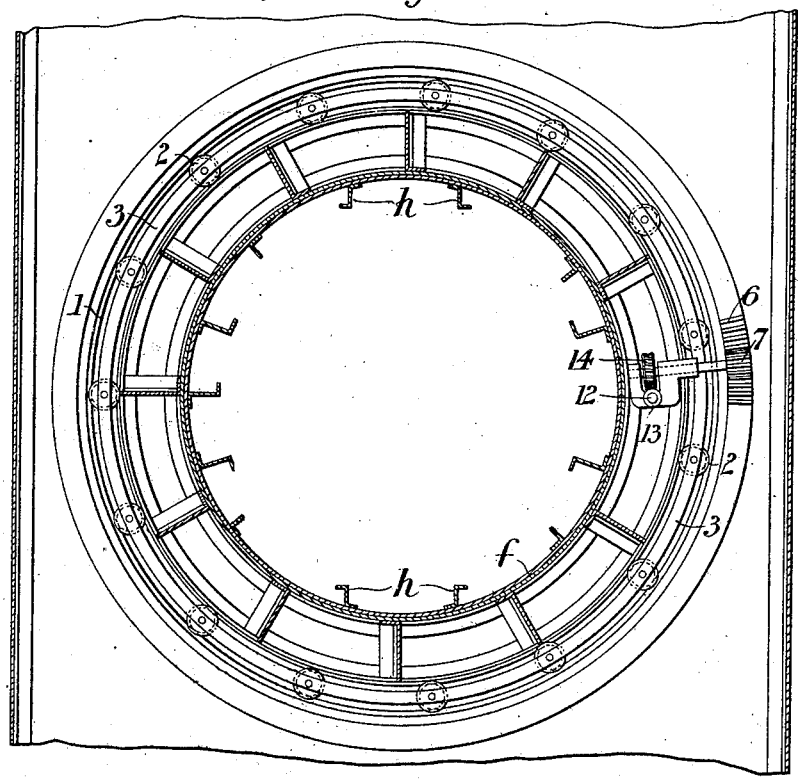
Figure 6:
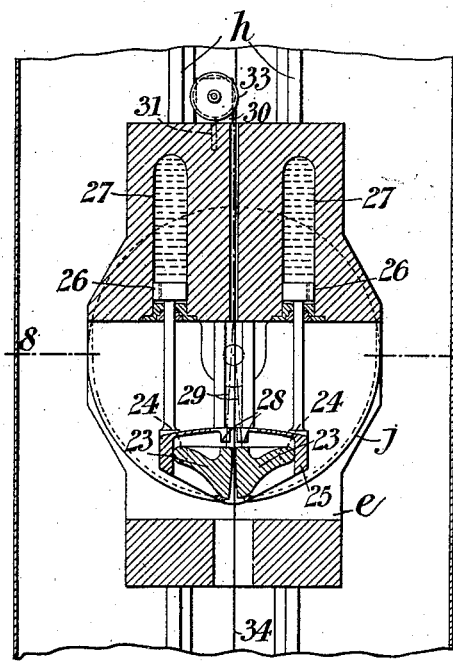
Figure 7:
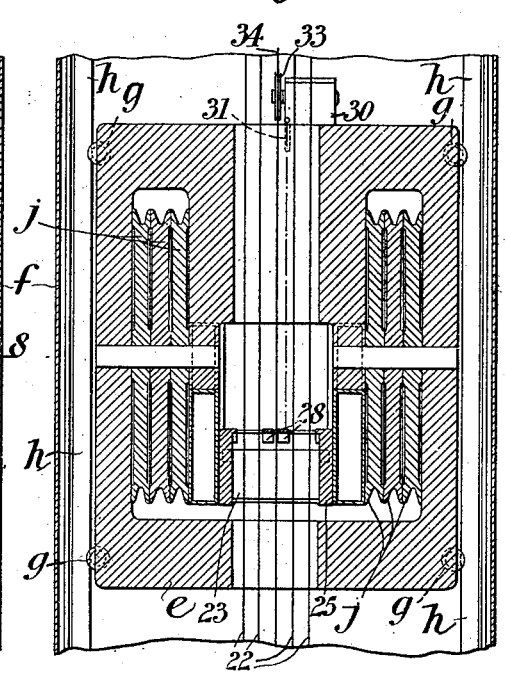
Figure 8:
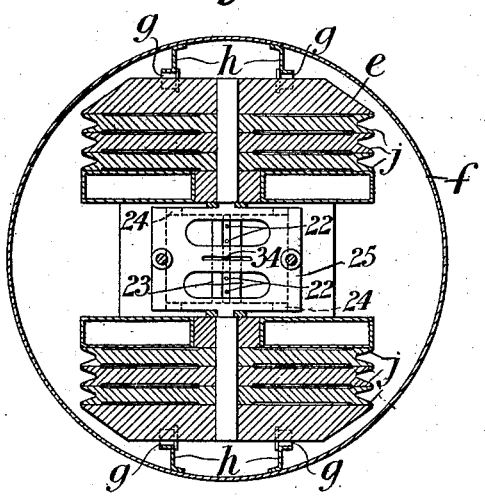
Figure 9:
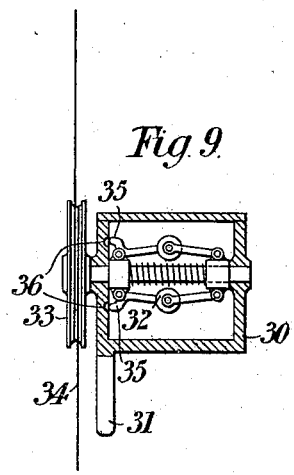

Figure 1 is a view illustrating a battle-ship being supplied with coal from a collier or transport according to our invention. Figs. 2 and 3 are respectively vertical sections at right angles of the vertical trunk or jib on the transport. Figs. 4 and 5 are respectively sections on the lines 4 4 and 5 5, Fig. 2. Figs. 6 and 7 are vertical sections at right angles of the weight supported by the traveling rope and also showing part of the trunk or jib. Fig. 8 is a section on the line 8 8, Fig. 6. Fig. 9 is a sectional elevation of a device in connection with the safety-grip on the said weight. Fig. 10 is a diagrammatic view illustrating the way in which the traveling rope is wound around the sheaves in the trunk and on the weight contained therein. Figs. 11 and 12 are sectional elevations at right angles of the means for hoisting the bags containing the coal or the like and of the rail or bar for shunting the same onto the traveling rope. Figs. 13 and 14 are views at right angles of a detail of the same. Fig. 15 is a side elevation of the pulley for the traveling rope on the ship receiving the supplies and of the shunt-bar for the reception of the bags from the said rope. Fig. 16 is a sectional plan of the same. Figs. 17 and 18 are elevations at right angles of the double hook by which the bags for containing the supplies are supported on the traveling rope, and Fig. 19 is a sectional elevation of the same. Figs. 2 and 3 are drawn to a larger scale than Fig. 1, Figs. 4 to 8, 11 and 12, and 15 and 16 to a larger scale than Figs. 2 and 3, and Figs. 9, 13, and 14 and 17 to 19 to still larger scales.

A is the ship or transport containing the coal or other supplies, and B the ship to be supplied.

$a$ is the traveling rope for carrying the bags $b$ $b$, containing the coal or the like, the said rope passing around and being driven by a pulley $c$ on the transport A and around another pulley $d$ on the ship B.

$e$, Figs. 2, 3, 6, 7, and 8, is the weight which is suspended on and by the traveling rope $a$, and $f$ is the trunk or jib on the transport A in which the weight $e$ is housed and which carries the pulley $c$. The said weight is advantageously guided as it rises and falls (owing to variations in the distance between the two ships) by means of rollers $g$ $g$, engaging rails $h$ $h$ in the trunk $f$.

$i$ $i$ are the pulleys in the trunk, and $j$ $j$ the pulleys on the weight $e$, around all of which the rope $a$ passes successively, whereby the movement of the said rope due to the movement of the ships toward or away from each other produces a relatively small fall and rise of the weight, as will be well understood.

Fig. 10 illustrates the arrangement of the rope $a$ around the pulleys $i$ $i$ and $j$ $j$ and also its connection with the driving-pulley $c$. By reference to this figure it will be seen that the pulleys $i$ $i$ and $j$ $j$ are divided into two groups of three each. Each of the groups of the pulleys $j$ $j$ is arranged below and practically in alinement with one of the groups of the pulleys $i$ $i$, and the pulley $c$ is arranged between the planes of the said groups, but at right angles thereto. To wind the pulleys with the rope $a$, the bight between the outgoing and incoming portions of the rope is taken and passed over the outside pulleys of the groups $i$ $i$, down and under the outside pulleys of the groups $j$ $j$, up and over the intermediate pulleys of the groups $i$ $i$, down and under the intermediate pulleys of the groups $j$ $j$, up and over the inisde pulleys of the groups $i$ $i$, down under the inside pulleys of the groups $j$ $j$, and finally up and resting in the upper part of the driving-pulley $c$. Although we have shown on the drawings six pulleys $i$ $i$ and six pulleys $j$ $j$, it is clear that more or less of each can be employed, the proportion between the relative movements of the ships and the consequent rise and fall of the weight $e$ being varied according to the number of pulleys employed.

Any suitable motor may be employed for driving the rope $a$. In the drawings we have illustrated a steam-engine $k$ for the purpose, as shown in Fig. 2. The said engine is mounted on the side of the trunk $f$ and drives the pulley $c$ from the crank-shaft $l$ of the motor through the medium of the worm $m$ on the said shaft, the worm-wheel $n$, pulley $o$, connected to the wheel $n$, chain $p$, pulley $q$, pulley $r$, connected to the pulley $q$, chain $s$, and pulley $t$, connected with the pulley $c$ through the medium of the variable-speed gear C.

The trunk $f$ is arranged to be slued or turned upon a vertical axis, as hereinbefore described, and for this purpose the lower part of the said trunk is advantageously provided with a central pivot $u$, engaging a bearing $v$, fixed to supports in the hold of the transport, and also with a peripheral bearing-ring $w$, bearing upon antifriction-rollers $x$ $x$, running on a circular track $y$, also fixed to supports in the said hold. The trunk is maintained in its vertical position by a bearing-ring $z$, some distance above its base, between which ring and a corresponding ring 1 on one of the decks of the transport is arranged a series of antifriction-rollers 2 2, connected by rings 3 3, supported by antifriction-rollers 4 4 on a track 5 on the said deck. For sluing the trunk we advantageously provide the circular-toothed rack 6, supported by the deck of the ship and having in gear with it a pinion 7, designed to be operated from the engine $k$ through the medium of the worm $m$ and worm-wheel $n$, hereinbefore described, and gear-wheels 8, bevel-wheel 9, bevel-wheels 10 or 11, shaft 12, worm 13, and worm-wheel 14, connected to the pinion 7. The wheels 10 and 11 are connected together, so that either can be engaged with the wheel 9 in order to rotate or slue the trunk in one direction or the other. By arranging the trunk $f$ to be slued the ships can vary their relative positions without interfering with the coaling operation. The pulley $d$ on the ship B is also capable of movement to coincide with that of the trunk $f$, and for this purpose it is carried by a bracket 15, Figs. 15 and 16, hinged at 16 to another bracket 17, attached to the said ship and preferably to the mainmast, as shown.

To supply steam to the engine $k$, we advantageously arrange a pipe 18, Fig. 2, one end of which is in connection with the source of supply, while the other end is connected to a recess 19 in the bearing $v$, which recess communicates with an opening 20 in the pivot $u$, to which is connected one end of the pipe 21, the other end being connected to the said engine. By this arrangement a flexible pipe connection is avoided.

22 22, Figs. 2, 3, 7, and 8, are the wire ropes, and 23 23 the grips, which we employ for arresting the weight $e$ should it fall by reason of the rope $a$ being suddenly cast off the pulley $d$ or breaking. The said ropes are attached to the upper and lower parts of the trunk $f$ and pass between the grips 23, which are pivoted at 24 24 within a casing 25, attached to perforated pistons 26 26, working in oil-cylinders 27 27 in the weight $e$. The grips have their opposing and gripping surfaces eccentric with their pivots, so that if the said grips be turned upward from the position shown in Fig. 6 they will grip the ropes 22 22, their upward movement being limited by stops 28 28. This upward movement is advantageously obtained by connecting the said grips by the one ends of chains or the like 29 29, the other ends of which are connected to a casing 30, Fig. 9, detachably connected with the weight $e$, for instance, by a projection 31 on the said casing engaging a socket on the said weight. This casing contains a centrifugal governor 32, the spindle of which carries a pulley 33, around which a rope 34, connected with the upper and lower parts of the trunk $f$, makes one or more turns, so that the normal up-and-down movements of the weight on the trunk $f$ cause the said pulley to revolve. The governor is so constructed that these normal movements do not affect the positions of the weighted arms thereof. If, however, a high speed is imparted to the said governor-arms, owing to the weight $e$ falling for the reasons above stated, they will fly out and cause projections 35 35 thereon to engage in a groove or recesses 36 36, so as to arrest the movement of the pulley 33, which being encircled by the rope 34 will be held thereby, and consequently prevent the casing 30 following the downward movement of the weight $e$, which therefore tends to leave the said casing suspended on the said rope. As, however, the grips 23 23 are connected to the said casing by the chains 29 29, the latter will lift the grips and engage them with the ropes 22 22, so as to gradually arrest the weight $j$ in its movement through the medium of the pistons 26, working in the oil in the cylinder 27.

For throwing the rope $a$ off the pulley $d$ on the ship B in case an excessive strain should come upon it, and so prevent accident to the trunk $f$, we advantageously form the bearing 37, carrying the said pulley, separate from the bracket 15, and we pivot it therein, as shown at 38, and provide the said bearing with an arm 39, which is locked to the said bracket by a pin 40, passing through lugs 41 41 on the bracket and through a hole on the said arm 39. The pin 40 is of such a section that it will withstand the strain due to the normal tension on the rope $a$; but if, say, twice this strain be exceeded the pin will be sheared by the arm 39, and consequently allow the latter to turn on its pivot 38 and throw the rope $a$ off the pulley $d$.

42, Figs. 17, 18, and 19, represents one of the double hooks for supporting the bags of coal or the like during transmission, 43 being the slip or disengaging tongue or hook which engages with the rope $a$, (or hoisting-gear, as hereinafter described,) as shown in dotted lines in Figs. 17 and 19, and 44 the fixed hook. The tongue 43 is pivoted at 45 within a slot 46 in the stock or body 47 of the device and is locked in the position shown in full lines in Fig. 19 by a spring catch or trigger 48. The inner face of the said tongue 43 forms an acute angle with the stock 47, so that the rope $a$ or the like becomes wedged between the said parts and so the hook 42 cannot slip thereon. By this arrangement when the hook 42, carrying a bag, passes a suitable striking plate or bar, as hereinafter described, the catch 48 comes into contact with the said striking-plate and allows the tongue 43 under pressure of the rope $a$ or the like to turn on its pivot into the position shown in dotted lines in Fig. 19, so that the said hook 42 becomes released from the said rope $a$, a spring 49 returning the tongue 43 to its normal position (which is determined by a stop 50) when clear of the said rope.

The gear for hoisting the bags and the shunt-bar for conveying them from the gear to engage the traveling rope $a$ is shown in Figs. 2, 4, 11, and 12. The said hoisting-gear comprises a series of rollers or trolleys 51 51, secured in pairs to two endless ropes 52 52 by cross-shafts 53 53, the said rollers being guided in grooves 54 54 in a casing 55 on the trunk $f$. 56 is a shackle on each of the shafts 53, to which shackle the slip-hooks 43 on the bags of coal or the like are connected. The ropes 52 52 pass around pulleys 57 57 and 58 58, the former serving to drive the ropes and trolleys by engaging the shafts 53 53 by means of notches 59 59. The pulleys 57 57 are advantageously mounted on the same shaft as the pulley q, so as to be driven thereby.

60 is the shunt-bar above referred to, the said bar being inclined and arranged at the upper end of the casing 55 with one end extending therein and in position to engage the fixed hook 44 of each double hook 42, carried by the cross-shafts 53 53 of the hoist. The shunt-bar is connected to the casing 55 by a bracket 61, and the other end of the bar engages the outgoing part of the traveling rope a by rollers 62 62.

In order that the bar 60 can move in accordance with any oscillatory movements of the rope a, it is connected to the bracket 61 by a universal joint 63. (Shown clearly in detail at Figs. 13 and 14.)

64 is the striking plate or bar with which the catch 48 on each hook 42, carrying a bag of supplies, comes into contact when arriving at the upper part of the hoist, so that the slip-hook 43 is disengaged from the shackle 56 and the fixed hook 44 consequently caused to engage the shunt-bar 60, down which it slides to the lower end, the slip-hook then engaging the traveling rope a. The space between the fixed hook 44 and the stock 47 of the double hook 42 is sufficiently large to allow the said hook to slide freely on the shunt-bar 60, and the incline of the shunt-bar is such that the bag of supplies attains approximately the speed of the traveling rope by the time it reaches the latter, thereby avoiding shock.

65, Figs. 15 and 16, is the shunt-bar, and 66 the striking-plate on the ship B, the said bar being jointed to a bar 67, advantageously pivoted to the bearing on the bracket 15 and bearing by means of a roller 68 on the incoming part of the rope a.

For bringing the bags of coal or other supplies into position beneath the shackles on the hoist in the transport we advantageously employ a horizontal conveyer consisting in this instance of a circular rack or trough 69, Figs. 2 and 3, into the after side of which the bags are placed, the rack being continuously revolved around the trunk f by suitable mechanism. In the said figures we have shown the said rack as being revolved from one of the gear-wheels 8 through the medium of the gear-wheels 70 71, pinion 72, and circular toothed rack 73 on the trough 69.

74, Fig. 4, is an inclined shunt-bar, and 75 a striking-plate connected to the casing 55 through the medium of a bar 76, jointed to the said casing and engaging by means of rollers 77 77 on the incoming part of the rope a, the said mechanism serving to disengage the returned empty bags from the said part of the rope a and divert them to the required part of the ship A.

78 78 are guide-pulleys on the casing 55, between which the outgoing and incoming parts of the rope pass.

The operation of the mechanism hereinbefore described is as follows—that is to say, the rope a is set in motion by the engine k through the medium of the pulley c, and the bags of coal or other supplies brought into position beneath the hoist on the transport A are engaged by means of their slip-hooks 43 with the shackles 56. When the bags arrive at the top of the hoist, the catches 48 come into contact with the striking plate or bar 64 and release the slip-hooks 43 from the shackles, so that the fixed hooks 44 engage the shunt-bar 60 and slide down the latter and engage with the traveling rope a by means of the slip-hooks, as hereinbefore described. The bags are then carried by the rope to the ship B, where the catches 48 come into contact with the striking-plate 66 and release the slip-hooks from the rope a, so that the fixed hooks 44 engage the shunt-bar 65, down which they slide with the bags to the deck or other part of the ship. The bags when empty are then engaged with the outgoing part of the rope a from the ship B, and when arriving back to the ship A the catches 48 come into contact with the striking-plate 75, so as to release the slip-hooks 43 from the rope a and allow the fixed hooks 44 to engage the bar 74, down which they slide with the bags to the required part of the ship. At the same time that the rope a is transporting the bags of supplies the required tension is maintained by the weight e, the said weight rising and falling to correspond with any variation of the distance between the ships. After the transporting of supplies is finished the bight of the rope a is released from the pulley d on the ship B and hauled in and stowed on the ship A.

Having now particularly described and ascertained the nature of our said invention and in what manner the same is to be performed, we declare that what we claim is—

1. In a transporting apparatus, the combination with an endless rope for transporting and sustaining loads during their transit, devices for supporting said rope at separated points capable of movement toward and from each other, said devices including a vertically-disposed trunk provided with guides, of a tension-weight in said trunk engaging said guides, means for attaching said weight to said rope to accommodate differences in the distance between said supporting devices, and driving mechanism for said rope, substantially as described.

2. In a transporting apparatus, the combination with the endless rope and devices for supporting it at separated points, of a tension-weight engaging said rope, to accommodate it to variations in the distances between said separated points, a supplemental supporting means for said weight, and means for automatically transferring the support of said weight from said rope to said supplemental support, to prevent the weight from falling in case of a sudden release of the said rope between said separated points, substantially as described.

3. In a transporting apparatus, the combination with an endless rope and means for supporting it at separated points of a tension-weight engaging a portion of said rope to accommodate it to variations in the distances between said separated points, supporting devices for said weight having a sliding engagement therewith, gripping devices for said supporting devices carried by said weight, normally out of operative position but adapted to be thrown into operation upon the sudden falling of said weight, substantially as described.

4. In a transporting apparatus, the combination with an endless rope and means for supporting it at separated points of a tension-weight engaging a portion of said rope to accommodate it to variations in the distances between said separated points, supporting devices for said weight having a sliding engagement therewith, gripping devices for said supporting devices carried by said weight and normally out of operative position, a governor connected with said gripping devices, and constructed to throw said grips into engagement with said supporting devices, upon the accelerated downward movement of said weight, substantially as described.

5. In a transporting apparatus, the combination with an endless rope and means for supporting it at separated points of a tension-weight engaging a portion of said rope to accommodate it to variations in the distances between said separated points, supporting devices for said weight having a sliding engagement therewith, gripping devices for said supporting devices carried by said weight, hydraulic pistons and cylinders forming the connection between said gripping devices and said weight, and a governor operatively connected with said gripping devices for throwing them into operation upon the accelerated downward movement of the weight to prevent its falling, substantially as described.

6. In endless rope transporting apparatus the combination with the endless rope of a weight suspended upon the said rope and two series of store-pulleys around which the rope passes one of which series is fixed relatively with the weight while the other series is attached to the weight and under variations of distance between the points between which transport is being effected rises and falls with the said weight, substantially as described.

7. The combination with an endless rope carried by pulleys for transporting supplies between objects the distance between which is constantly varying, of a weight suspended upon the said rope, two series of store-pulleys around which the rope passes one of which series is fixed relatively with the weight while the other series is carried by the weight, a trunk or jib for carrying the said series of pulleys and weight and capable of rotation on a vertical axis and a supporting-pulley in the bight of the rope most remote from the trunk capable of movement around a vertical axis so as to constantly maintain the same position relatively with the rope, substantially as described.

8. In endless rope transporting apparatus wherein a suspended weight is arranged in combination with store-pulleys the combination with the said weight of a pair of pivoted grips having eccentric surfaces and connected to pistons working in cylinders containing a liquid, fixed ropes passing between the grips and a governor connected to the grips and having a pulley encircled by a fixed rope and lugs on the governor-arms designed to engage a groove or recesses in the governor-casing when the weight moves at an abnormal speed, substantially as, and for the purpose, set forth.

9. In a transporting device, the combination with an endless rope and devices for supporting it at separated points, capable of movement toward and from each other, of a tension-weight engaging said rope to accommodate variations in the distance between said supporting devices, means for operating said rope, an elevating apparatus having its upper end above said rope and a shunting device for transferring loads automatically from said elevating apparatus to said rope, substantially as described.

10. In a transporting apparatus, the combination with an endless rope, and means for supporting it at separated points, of a tension device engaging said rope to accommodate it to variations in the distances between said points, means for operating said rope, an elevating apparatus, a horizontal conveyer adjacent to the lower end of said elevating apparatus, adapted to carry the loads thereto and automatic devices for transferring the loads from said elevating apparatus to said rope, substantially as described.

11. In a transporting apparatus, the combination with the endless rope, and a support for the same, of a second support comprising a pulley engaging a bight of said rope, a support for said pulley provided with a breakable part, constructed to break under abnormal strain to release said rope, substantially as described.

12. In a transporting apparatus, the combination with the endless rope, and a support for the same, of a second support comprising a pulley engaging a bight of said rope, a pivoted support for said pulley, a breakable part holding said pivoted support and pulley in normal position and constructed to break under abnormal strain to permit the said pulley to turn on its pivotal connection and throw off the rope, substantially as described.

13. In a transporting apparatus, the combination with the endless rope, and a support for the same, of a second support comprising a pulley engaging a bight of said rope, a pivoted support for said pulley provided with a shearing-arm, a breakable pin engaging said arm, and constructed to withstand normal strains, whereby when subjected to abnormal strain said arm will break said pin and permit the pulley to swing on its pivotal connection to throw off said rope, substantially as described.

14. In a transporting apparatus, the combination with a vertically-disposed support, pivoted vertically, of an endless rope supported thereby, a tension device for said rope, and a second support for said rope at a distance from said first-mentioned support, and pivoted vertically, whereby said support may be maintained in line with the portions of the rope between said supports, substantially as described.

15. In a transporting apparatus, the combination with a vertically-disposed support, pivoted vertically and means for rotating said support upon its pivotal connection, of an endless rope connected to said support, a tension-weight for said rope, engaging and being guided vertically by said support, and a second support for said rope at a distance from said first-mentioned support and pivoted vertically, whereby said supports can be maintained in line with the portions of said rope between them, substantially as described.

16. In a transporting apparatus, the combination with a vertically-disposed support, pivoted vertically and means for moving it upon its pivotal connection, of an endless rope connected to said support, a tension-weight engaging and being guided by said support, a second support for said rope at a distance from said vertical support, an elevating apparatus adjacent to said vertical support, automatic devices for transferring the loads from said elevating apparatus to said rope, an annular horizontal conveyer surrounding said vertical support adjacent to the lower end of said elevating apparatus and means for rotating said conveyer; substantially as described.

GEORGE COLBY MACKROW.
HERBERT GEORGE CAMERON.

Witnesses:
JOHN E. BOUSFIELD,
C. G. REDFERN.